Figure 4:
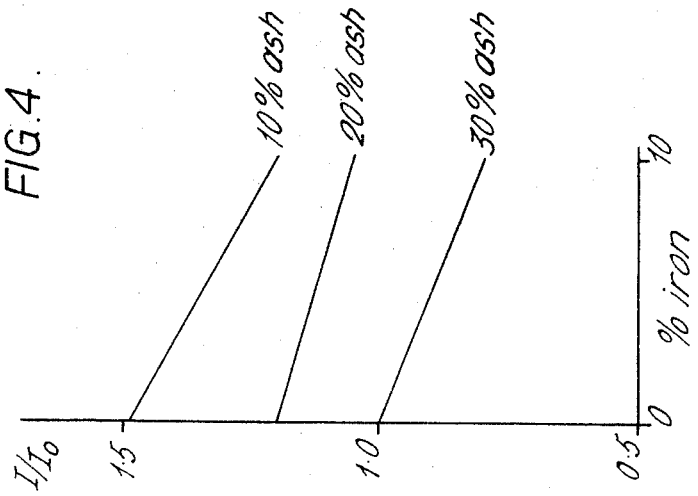

Aug. 30, 1966  J. R. RHODES  3,270,204
DETERMINATION OF THE ASH CONTENT OF COAL BY MEANS OF X-RAYS
Filed Jan. 30, 1963
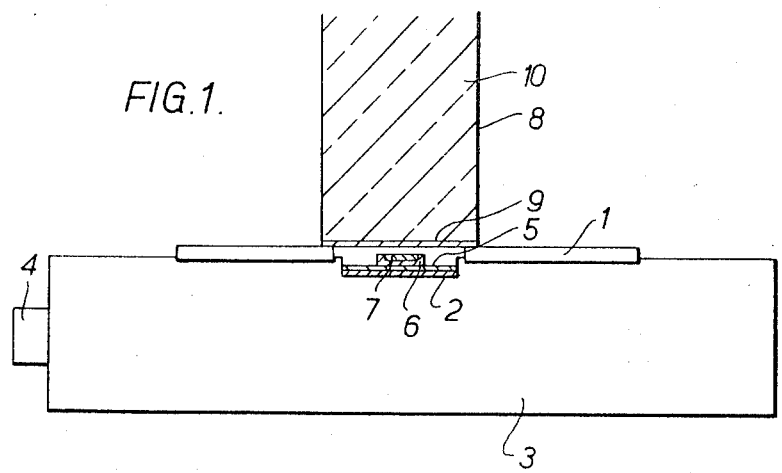
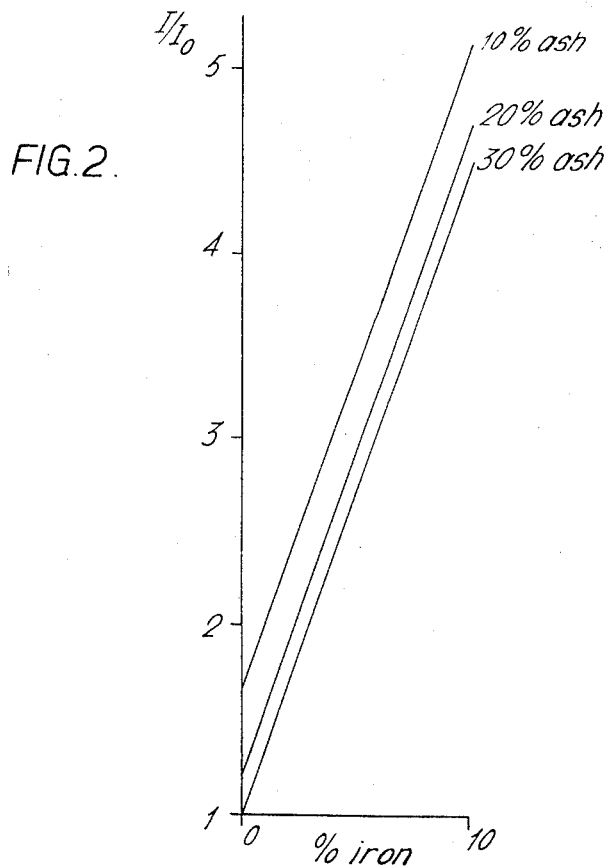

United States Patent Office 3,270,204
Patented August 30, 1966

3,270,204
DETERMINATION OF THE ASH CONTENT OF COAL BY MEANS OF X-RAYS
John Rathbone Rhodes, Wallingford, England, assignor to United Kingdom Atomic Energy Authority, London, England
Filed Jan. 30, 1963, Ser. No. 254,860
Claims priority, application Great Britain, Feb. 12, 1962, 5,223/62
8 Claims. (Cl. 250—83.3)

The present invention relates to apparatus for the determination of the ash content of coal by a radiation method.

There are three types of interactions of radiation with matter which are relevant to the general problem and all are dependent on atomic number. These interactions are beta particle backscattering, X-ray absorption and X-ray backscattering. I have found that X-ray absorption is not practicable as it is too dependent upon variations in sample mass per unit area, whereas backscattering methods are not dependent on this factor, provided that a sufficient thickness of sample is used to cause saturation backscattering.

The atomic number of coal is about 5 and of ash is about 11, but one of the most common contaminants of ash is iron which has an atomic number of 26 and it is the object of the present invention to provide apparatus for determining the ash content of coal by a method which is substantially independent of the iron content.

The invention is adapted to perform a method of determining the ash content of coal by the backscattering of X-rays which comprises passing X-rays of energy in the range 7.11 kev. to 20 kev. into a sufficient thickness of coal sample to cause saturation backscattering, and measuring the resultant backscattered radiation through a filter of thickness such that variations in the intensity of the backscattered radiation due to changes in the iron content of the ash are largely overcome.

The invention includes apparatus for the determination of the ash content of coal by the backscattering of X-rays which comprises a coal sample holder, means for passing X-rays of energy in the range of 7.11 kev. to 20 kev. into a coal sample of sufficient thickness to cause saturation backscattering in the holder, a filter of thickness such that variations in the intensity of the back-scattered radiation due to changes in the iron content of the ash are largely overcome, and means to measure the backscattered radiation through said filter.

A suitable source of X-rays is a tritium/zirconium bremsstrahlung source.

If the X-ray source that is used has a continuous spectrum, as have many of the sources now in common use, a portion of the spectrum must lie within the range 7.11 kev. to 20 kev. and preferably none of the spectrum will lie above 20 kev. It is not important if some of the spectrum lies below 7.11 kev. as this portion will be preferentially attenuated by the filter and can be effectively ignored for reasons which will be apparent hereinafter. Desirably in the case of continuous spectra, the mean energy will lie within the aforesaid range.

Other sources which may be used are a tritium/titanium bremsstrahlung source (having a mean energy of approximately 7 kev.) and a promethium-147/aluminium bremsstrahlung source which is conveniently used to excite monochromatic X-rays in the range 14–20 kev., for example by the use of a zirconium target when the X-rays will have an energy of approximately 15.7 kev. As will be apparent, the use of X-rays of slightly higher energy has the advantage that greater penetration is achieved so that the coal sample must be thicker but may, at the same time, contain larger particles.

The actual thickness of the filter must be determined for each specific arrangement of source and sample but this is readily done as will be apparent hereinafter.

The coal particle sizes are preferably not greater than 1 mm. in diameter if the tritium/zirconium sources is used. The arrangement is such that a radiation source is desirably used which gives approximately maximum sensitivity to ash content and the consequent sensitivity to iron content is eliminated by the use of the filter. We have found that beta particle backscattering is less sensitive to ash content in the range 0 to 30 percent ash (which is the range of interest) although it is more sensitive for higher ash contents. Consequently, in general, the present invention is preferably applicable only to ash contents below 30%. Moreover, a further disadvantage of beta particle backscattering is that we have found no easy method to compensate for iron content variations.

Figure 3:
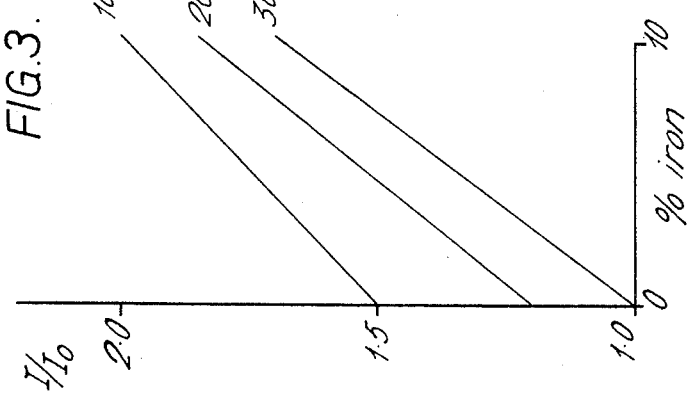

In order that the present invention may more readily be understood one embodiment of the apparatus for carrying the same into effect will now be described with reference to the accompanying drawings, wherein:

FIGURE 1 is schematic view of the apparatus, and
FIGURES 2, 3 and 4 are graphs showing the effect of filters.

Referring now to FIGURE 1, a table 1 has an aperture in which is located a detector window 2, the table 1 being mounted above a proportional counter 3 which is provided with a socket 4 for connection to the usual power supplies, amplifier and scaler. The detector window 2 is a foil of beryllium, for example 0.02 in. thick, and supports a source holder 6 in which is mounted a radiation source 7. An aluminium filter 5 is located between the window 2 and the source holder 6. The preferred radiation source is a tritium/zirconium bremsstrahlung source which has a continuous energy spectrum ranging between 3 kev. and 15 kev., rising to a maximum at about 8 kev., the mean value also being about 8 kev. A sample container 8 is mounted on the table 1 and has a window 9 on its lower face, this window conveniently being a foil of beryllium 0.01" thick. The sample container houses a sample 10 of coal.

The device is calibrated with samples of known ash content and ash contents of between 0 and 30% give count rates varying between 400 and 250 counts per second.

Theoretical support for the limits chosen for the source energy and filter will now be given, the calculations also showing the advantages to be gained by using the invention.

The intensity I of radiation backscattering from a sample comprising a plurality of elements $i$ can be expressed as a fraction of the incident intensity $I_0$ as follows:

$$\frac{I}{I_0} = k\left[\frac{\sum_i \sigma_i r_i}{\sum_i \mu_i r_i} + f(\tau)\right][1 - e^{-2\Sigma_i \mu_i r_i m}] \quad (1)$$

where:
$k$ is a constant depending on geometry;
$r_i$ is the proportion by weight of the element $i$;
$\sigma_i$ (cm.$^2$/gm.) is the total scattering coefficient of the element $i$;
$\mu_i$ (cm.$^2$/gm.) is the total mass absorption coefficient of the element $i$;
$m$ (gm./cm.$^2$) is sample mass per unit area;
$f(\tau)$ is a measure of the intensity of any characteristic X-rays excited in the specimen.

The following relations also hold:

$$\sigma_i = \sigma_c + \sigma_{coh} \quad (2)$$

$$\mu_i = \sigma_c + \sigma_{coh} + \tau_i = \sigma_i + \tau_i \quad (3)$$

where:
$\sigma_c$ is the Compton scattering coefficient of the element $i$;
$\sigma_{coh}$ is the coherent scattering coefficient of the element $i$;

$\tau_i$ (cm.²/gm.) is the mass absorption coefficient of the element $i$ due to photoelectric absorption.

The coefficients $\sigma_{coh}$ and $\tau_i$ are both dependent on atomic number unlike the coefficient $\sigma_c$.

It is convenient to rewrite Equation 1 as follows:

$$\frac{I}{I_o} = k[I_s + f(\tau)][1 - I_u] \quad (4)$$

where:

$$I_s = \frac{\sum_i \sigma_i r_i}{\sum_i \mu_i r_i} \quad (5)$$

$$I_u = e^{-2\sum_i \mu_i r_i m} \quad (6)$$

The term $I_u$ of Equation 6 shows how the intensity of backscattered radiation varies with mass per unit area and, as we wish to remove this factor, a sample of sufficient thickness, i.e., saturation thickness for the incident radiation, is taken to ensure that $I_u = 0$.

Hence Equation 4 simplifies to:

$$\frac{I}{I_o} = k[I_s + f(\tau)] \quad (7)$$

The term $I_s$ is a measure of the saturation backscatter radiation intensity and since $\sigma$ and $\mu$ are each functions of both atomic number and source energy, the term $I_s$ will consequently depend on sample composition and source energy. The aim is to provide a value for source energy which gives maximum sensitivity to ash content variation (i.e., maximum dependence of term $I_s$ on atomic number) but minimum sensitivity to the iron content of the ash.

With a source energy of several hundred kev., $\sigma_{coh}$ is negligible and also for the elements in question $\sigma_c \gg \tau$. Hence from Equation 3:

$$I_s = \frac{\sum_i \sigma_i r_i}{\sum_i \mu_i r_i} \longrightarrow \frac{\sum_i \sigma_i r_i}{\sum_i \sigma_i r_i} = 1 \quad (8)$$

As the source energy is decreased, $\tau$ becomes equal to or greater than $\sigma_c$, but provided the source energy is greater than about 20 kev., $\sigma_{coh}$ is still negligible. Consequently for source energies of about 50 kev., $\Sigma_i \sigma_i r_i$ is independent of atomic number whilst $\Sigma_i \mu_i r_i$ increasingly depends on atomic number as the source energy decreases. Hence $I_s$ decreases with increasing mean atomic number of the sample.

For source energies in the range 5 to 10 kev., $\sigma_{coh}$ is greater than $\sigma_c$ so that the numerator of the fraction $I_s$ also depends on atomic number. Hence the rate of change of $I_s$ with atomic number begins to decrease as the source energy falls below 10 kev. Maximum sensitivity to atomic number (and ash content) therefore calls for a source energy in the range 10 to 20 kev. It will be appreciated that the average atomic number of a sample is dependent not only on the ash content of the coal, but also on the iron content of the ash, considerable variations in the apparent ash content being obtained due to variations in the iron content of the ash whilst the ash content of the coal remains constant.

The effect of the term $f(\tau)$ in Equation 7 will now be considered. Under the circumstances, the only X-ray which could be excited is the iron radiation FeK, whose energy is 6.4 kev., but this radiation is not excited by source energies below 7.11 kev.

We may now consider the effect of source energy on the backscattering due to iron and below an energy of 7.11 kev. intensity variations due to iron content variations are small, arising solely from the $\sigma_{coh}$ factor. Above 7.11 kev., however, an increase in the iron content of the ash causes a greater variation in the backscattered intensity that does a similar ash content increase. It follows, therefore, that a source energy of just below 7.11 kev. will give maximum insensitivity to iron but also to a non-maximum sensitivity to ash. However, a prior proposal has used the cobalt K radiation (6.9 kev.) in spite of its relative insensitivity to ash.

We have chosen a source with a mean energy above 7.11 kev. in order to obtain increased sensitivity to ash and in this region the term $f(\tau)$ is relatively large. We may deduce that for the source used (chosen for maximum sensitivity to ash), the intensity of the Fe K X-rays (an increasing function of iron content) will tend to balance the scattered intensity (a decreasing function of iron content). The dependence of scattered intensity due to ash content as a whole appears to be little affected.

In practice a tritium/zirconium bremsstrahlung source, which has a continuous energy spectrum from 3 to 15 kev. and a mean value of about 8 kev., may be used. Using this source and the arrangement of FIG. 1, the curves of FIG. 2 were obtained, showing that the Fe K X-radiation predominates over the backscattering, since the intensity of the radiation increases with increasing iron content. However, the average backscattered intensity is equal to the average source energy (8 kev.) and, since the Fe K X-rays have an energy of 6.4 kev., it is possible to filter out some of the Fe K radiation by using, for example, an aluminium foil filter, the total mass absorption coefficient of aluminium at 8 kev. being 50 cm.²/gm. and at 6.4 kev. being about 110 cm.²/gm.

The effect of this aluminium filter is shown in FIGS. 2, 3 and 4, which are graphs showing the ratio $I/I_o$ for the different ash contents and an iron content varying between 0 and 10% by weight. In FIG. 2 the graph shows the situation where no filter is provided and it will be seen that the count rate decreases as the ash content increases (which is required) but also that it increases rapidly with increasing iron content (which is not required). FIG. 3 shows the effect of examining the same samples with an aluminium filter 0.0076 cm. thick, and it will be seen that the effect of the Fe K X-rays has been reduced whilst the effect of the ash is little changed. FIG. 4 on the other hand shows the effect of the use of a filter 0.0127 cm. thick and it will be clear that most, if not all, of the Fe K X-rays have been removed and that increasing the iron content now results in a decrease in the backscattered X-rays. This decrease in the backscattered X-rays is caused by the removal, by the aluminium filter, of most of the fluorescent Fe K X-rays, resulting in the $I_s$ term of Equation 4 predominating over the term $f(\tau)$. Since the term $I_s$ depends on the average atomic number of the sample and since increase in iron content results in an increase in the average atomic number, the increasing iron content will result in the decrease in the backscattered radiation shown in FIG. 4. With the present geometry, the use of aluminium filter 0.0086 cm. thick reduces the sensitivity to iron substantially to zero, whilst having little effect upon the ash content sensitivity. It has been found that, using a filter of a given thickness, exact compensation is obtained only when the ash content is that for which the filter was calibrated to remove the effect of the iron. With a lower ash content, the effect of the iron is under compensated whilst with a higher ash content the effect of the iron is over compensated. It has been found that, within the limits of experimental error, a reasonably accurate measurement may be obtained using three filters, of differing thickness, for an ash content of up to 35% as follows:

| Filter thickness: | Ash content, percent |
|---|---|
| 0.0076 cm. (0.003 in.) | 0–18 |
| 0.0089 cm. (0.0035 in.) | 15–25 |
| 0.0102 cm. (0.004 in.) | 22–35 |

It will be appreciated that the filter thickness required will be dependent on the geometry of the apparatus used. Since the ash content of the coal is usually known approximately before testing, a suitable filter may be chosen for that approximate ash content.

Using a tritium/titanium bremsstrahlung source, it is desirable that the size of the coal particles should not be greater than 1 mm. in diameter. If a source with a higher energy is used, greater penetration of the sample is obtained, and it is then possible to measure the ash content of coal with particle sizes of up to about 1 cm. in diameter, particularly if the coal is being presented to the apparatus in a continuous stream. Using a higher source energy it has been found that the efficiency of excitation of the iron decreases, and that at a source energy of about 14–16 kev. the intensity of the fluorescent Fe K X-rays is decreased to such an extent that separate filtration of the backscattered X-rays, other than filtratration by the detector window and possibly the sample holder window, is unnecessary, the variation in the fluorescent X-rays of the iron balancing the variation in the backscatter due to the iron. The zirconium $K_\alpha$ X-rays possess an energy of 15.77 kev. and excitation of these X-rays would thus provide a suitable X-ray source falling in this energy range. With source energies in excess of about 16 kev., compensation for iron content by the use of filters is no longer possible since the efficiency of excitation of the iron fluorescent X-rays becomes very small.

Using any of the arrangements described herein, the ash content may be determined by the use of the usual calibration curve, substantially independently of the iron content.

The apparatus of the present invention may be connected in such a way as to grade coal according to its ash content. This general method of grading using other ash measuring apparatus is quite well known and need only be outlined here.

A stream of coal of the thickness required to cause saturation backscattering is caused to flow past the apparatus of the present invention. Conveniently this may be done with the coal on a conveyor belt of mylar of thickness .002″, the source being underneath the belt. The backscattered X-rays are measured by a suitable counter as herebefore described, the electrical output from the counter, which depends on the ash content of the coal, is led to an amplifier and the output from this amplifier causes sorting devices to grade the coal according to its ash content.

I claim:
1. Apparatus for the determination of the ash content of coal by the backscattering of X-rays which comprises a sample holder positioned to contain a sample of coal of sufficient thickness to cause saturation backscattering, an X-ray source providing X-rays in the range 7.11 kev. to 20 kev., means to measure the intensity of backscattered X-rays and iron K fluorescent X-rays from the sample, and filter means placed between said sample holder and said radiation measuring means for reducing the intensity of iron K fluorescent X-rays relative to the reduction in intensity of backscattered X-rays so as to prevent variations in the total intensity of the measured X-rays due to variable iron content in the sample.

2. Apparatus for the determination of the ash content of coal free from the effects of any iron contained in the ash, such apparatus comprising an X-ray source providing X-rays in the range 7.11 kev. to 20 kev., a coal sample holder positioned to receive X-rays from the said source and to contain a coal sample of thickness to cause saturation backscattering of the said X-rays, means to measure radiation backscattered from a coal sample contained in the said coal sample holder, and a filter means placed between the said coal sample holder and said radiation measuring means for preventing variations in the total intensity of the measured radiation due to variations in iron content, said filter being made of a material having a higher mass absorption coefficient for iron K fluorescent X-rays than for X-rays in the range 7.11 kev. to 20 kev.

3. Apparatus as claimed in claim 2 wherein the X-ray source is a radio-active isotope.

4. Apparatus as claimed in claim 3 where the X-ray source is a tritium/zirconium bremsstrahlung source having a mean energy of about 8 kev.

5. Apparatus as claimed in claim 2 in which the filter is an aluminium filter.

6. Apparatus as claimed in claim 5 wherein the coal has an ash content in the range 0–18%, the source is a tritium/zirconium bremsstrahlung source, and the filter thickness is 0.003 inch.

7. Apparatus as claimed in claim 5 wherein the coal has an ash content in the range 15–25%, the source is a tritium/zirconium bremsstrahlung source, and the filter thickness is 0.0035 inch.

8. Apparatus as claimed in claim 5 wherein the coal has an ash content in the range 22–35%, the source is a tritium/zirconium bremsstrahlung source, and the filter thickness is 0.004 inch.

References Cited by the Examiner

UNITED STATES PATENTS

| | | | |
|---|---|---|---|
| 2,861,188 | 11/1958 | Dijkstra | 250—83.3 |
| 2,944,153 | 7/1960 | Brown | 250—106 |
| 2,958,777 | 11/1960 | Sieswerda et al. | 250—43.5 X |
| 3,056,027 | 9/1962 | Martinelli | 250—83.3 |

RALPH G. NILSON, *Primary Examiner.*

ARCHIE R. BORCHELT, *Examiner.*